United States Patent
Wlodarczyk

(10) Patent No.: US 9,482,088 B2
(45) Date of Patent: Nov. 1, 2016

(54) MEAN REGRESSION FUNCTION FOR PERMEABILITY

(75) Inventor: Sylvain Wlodarczyk, Saint-Clement-de-Riviere (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 633 days.

(21) Appl. No.: 14/000,879

(22) PCT Filed: Feb. 24, 2012

(86) PCT No.: PCT/US2012/026606
§ 371 (c)(1),
(2), (4) Date: Feb. 7, 2014

(87) PCT Pub. No.: WO2012/116320
PCT Pub. Date: Aug. 30, 2012

(65) Prior Publication Data
US 2014/0142857 A1    May 22, 2014

Related U.S. Application Data

(60) Provisional application No. 61/446,172, filed on Feb. 24, 2011.

(51) Int. Cl.
| | |
|---|---|
| G06F 19/00 | (2011.01) |
| E21B 49/00 | (2006.01) |
| G01V 1/30 | (2006.01) |
| G01V 1/50 | (2006.01) |

(52) U.S. Cl.
CPC .............. E21B 49/00 (2013.01); G01V 1/306 (2013.01); G01V 1/50 (2013.01)

(58) Field of Classification Search
CPC ..... C09K 8/592; E21B 36/001; E21B 36/04; E21B 41/0057
USPC .............................. 702/12–14, 182–185, 188
See application file for complete search history.

(56) References Cited

U.S. PATENT DOCUMENTS

| | | | | |
|---|---|---|---|---|
| 4,817,062 A | * | 3/1989 | De Buyl ................ | G01V 1/282 367/57 |
| 5,835,883 A | * | 11/1998 | Neff ....................... | G01V 11/00 702/12 |
| 6,140,816 A | | 10/2000 | Herron | |
| 7,516,016 B2 | | 4/2009 | DeMartini et al. | |
| 2010/0300682 A1 | | 12/2010 | Thakur et al. | |

OTHER PUBLICATIONS

Koenker, R., "Quantile Regression", 2005, Cambridge University Press, New York, New York, pp. 1-9, 27-46, 139-151
Delfiner, P., "Three Statistical Pitfalls of Phi-K Transforms", SPE-102093-PA, SPE Reservoir Evaluation & Engineering, Dec. 2007, vol. 10(6): pp. 609-617.
International Search Report and Written Opinion of PCT Application No. PCT/US2012/026606 dated Sep. 27, 2012: pp. 1-7.

* cited by examiner .

*Primary Examiner* — Edward Raymond

(57) ABSTRACT

A method having obtaining one or more porosity data of a subsurface of the Earth using a data acquisition tool; computing one or more permeability data from the porosity data using a transformation function; computing a first quantile regression function and a second quantile regression function of the one or more permeability data; producing a combined mean regression function of the one or more permeability data by summing the first quantile regression function and the second quantile regression function, wherein the first quantile regression function is multiplied by a first coefficient and the second quantile regression function is multiplied by a second coefficient; and using the combined mean regression function to predict a mean permeability of the subsurface.

20 Claims, 7 Drawing Sheets

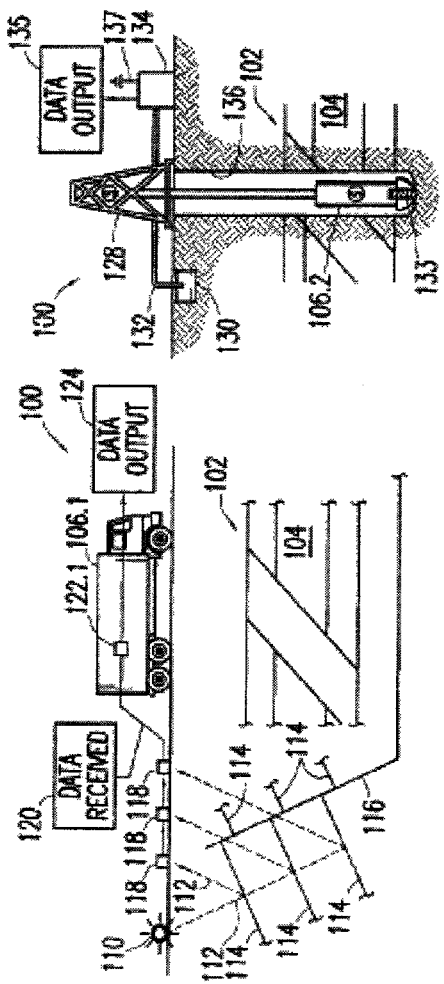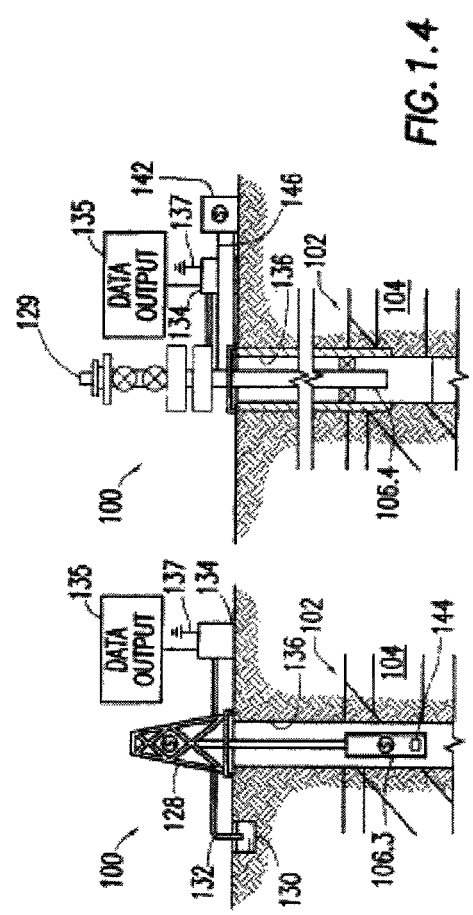

MEAN REGRESSION FUNCTION FOR PERMEABILITY

BACKGROUND

1. Field of the Invention

Implementations of various technologies described herein generally relate to determining a mean regression function for permeability.

2. Discussion of the Related Art

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Oilfield operations, such as surveying, drilling, wireline testing, completions, production, planning and oilfield analysis, are typically performed to locate and gather valuable downhole fluids. Surveys are often performed using acquisition methodologies, such as seismic scanners or surveyors, to generate maps of underground formations. These formations are often analyzed to determine the presence of subterranean assets, such as valuable fluids or minerals. This information is used to assess the underground formations and locate the formations containing the desired subterranean assets. This information may also be used to determine whether the formations have characteristics suitable for storing fluids. Data collected from the acquisition methodologies may be evaluated and analyzed to determine whether such valuable assets are present, and if they are reasonably accessible.

One or more wellsites may be positioned along the underground formations to gather valuable fluids from the subterranean reservoirs. The wellsites are provided with tools capable of locating and removing hydrocarbons, such as oil or gas, from the subterranean reservoirs. Drilling tools are typically deployed from the oil and gas rigs and advanced into the earth along a path to locate reservoirs containing the valuable downhole assets. Fluid, such as drilling mud or other drilling fluids, is pumped down the wellbore through the drilling tool and out the drilling bit. The drilling fluid flows through the annulus between the drilling tool and the wellbore and out the surface, carrying away earth loosened during drilling. The drilling fluids return the earth to the surface and seal the wall of the wellbore to prevent fluid in the surrounding earth from entering the wellbore and causing a 'blow out.'

During the drilling operation, the drilling tool may perform downhole measurements to investigate downhole conditions. The drilling tool may be used to take core samples of the subsurface formations. In some cases, as shown in FIG. 1C, the drilling tool is removed and a wireline tool is deployed into the wellbore to perform additional downhole testing, such as logging or sampling. Steel casing may be run into the well to a desired depth and cemented into place along the wellbore wall. Drilling may be continued until the desired total depth is reached.

After the drilling operation is complete, the well may then be prepared for production. Wellbore completions equipment is deployed into the wellbore to complete the well in preparation for the production of fluid through the wellbore. Fluid is then allowed to flow from downhole reservoirs into the wellbore and then the surface. Production facilities are positioned at surface locations to collect the hydrocarbons from the wellsite(s). Fluid drawn from the subterranean reservoir(s) passes to the production facilities via transport mechanisms, such as tubing. Various types of equipment may be positioned about the oilfield to monitor oilfield parameters, to manipulate the oilfield operations, and/or to separate and direct fluids from the wells. Surface equipment and completion equipment may also be used to inject fluids into reservoirs, either for storage or at strategic points to enhance production of the reservoir.

During the oilfield operations, data is typically collected for analysis and/or monitoring of the oilfield operations. Such data may include, for example, subterranean formation, equipment, historical and/or other data. Data concerning the subterranean formation is collected using a variety of sources. Such formation data may be static or dynamic. Static data may relate to, for example, formation structure and geological stratigraphy that define geological structures of the subterranean formation. Dynamic data may relate to, for example, well production data. Such static and/or dynamic data may be collected to learn more about the formations and the valuable assets contained therein.

Sources used to collect static data may be seismic tools, such as a seismic truck that sends compression waves into the earth. Signals from these waves are processed and interpreted to characterize changes in the anisotropic and/or elastic properties, such as velocity and density, of the geological formation at various depths. This information may be used to generate basic structural maps of the subterranean formation. Other static measurements may be gathered using downhole measurements, such as core sampling and well logging techniques. Core samples are used to take physical specimens of the formation at various depths as shown in FIG. 1B. Well logging involves deployment of a downhole tool into the wellbore to collect various downhole measurements, such as density, resistivity, etc., at various depths. Such well logging may be performed using, for example, a drilling tool and/or a wireline tool. Once the well is formed and completed, fluid flows to the surface using production tubing and other completion equipment. As fluid passes to the surface, various dynamic measurements, such as fluid flow rates, pressure and composition may be monitored. These parameters may be used to determine various characteristics of the subterranean formation.

Sensors may be positioned about the oilfield to collect data relating to various oilfield operations. For example, sensors in the drilling equipment may monitor drilling conditions, sensors in the wellbore may monitor fluid composition, sensors located along the flow path may monitor flow rates and sensors at the processing facility may monitor fluids collected. Other sensors may be provided to monitor downhole, surface, equipment or other conditions. Such conditions may relate to the type of equipment at the wellsite, the operating setup, formation parameters or other variables of the oilfield. The monitored data is often used to make decisions at various locations of the oilfield at various times. Data collected by these sensors may be further analyzed and processed. Data may be collected and used for current or future operations. When used for future operations at the same or other locations, such data may sometimes be referred to as historical data. The data may be used to predict downhole conditions, and make decisions concerning oilfield operations. Such decisions may involve well planning, well targeting, well completions, operating levels, production rates and other operations and/or operating parameters. Often this information is used to determine when to drill new wells, re-complete existing wells or alter wellbore production. Oilfield conditions, such as geological, geophysical, and reservoir engineering characteristics, may have an impact on oilfield operations, such as risk analysis, economic valuation, and mechanical considerations for the production of subsurface reservoirs. Data from one or more wellbores may be analyzed to plan or predict various outcomes at a given wellbore. In some cases, the data from neighboring wellbores, or wellbores with similar conditions or equipment, may be used to predict how a well will perform. There are usually a large number of variables and large quantities of data to consider in analyzing oilfield operations. It is, therefore, often useful to model the behavior of the oilfield operation to determine a desired course of action. During the ongoing operations, the operating parameters may need adjustment as oilfield conditions change and new information is received.

SUMMARY

Various techniques described herein are directed to a method. The method obtains one or more porosity data of a subsurface of the Earth using a data acquisition tool; computes one or more permeability data from the porosity data using a transformation function; computes a first quantile regression function and a second quantile regression function of the one or more permeability data; produces a combined mean regression function of the one or more permeability data by summing the first quantile regression function and the second quantile regression function, wherein the first quantile regression function is multiplied by a first coefficient and the second quantile regression function is multiplied by a second coefficient; and uses the combined mean regression function to predict a mean permeability of the subsurface.

In one implementation, the method further computes a third quantile regression function of the one or more permeability data.

In another implementation, the combined mean regression function further includes summing the first quantile regression function, the second quantile regression function, and the third quantile regression function, wherein the third quantile regression function is multiplied by a third coefficient.

In one implementation, in a graphical plot of the permeability data relative to the porosity data, 10% of the one or more permeability data fall below a curve of the first quantile regression function, 50% of the one or more permeability data fall below a curve of the second quantile regression function, and 90% of the one or more permeability data fall below a curve of the third quantile regression function.

In one implementation, in a graphical plot of the permeability data relative to the porosity data, 5% of the one or more permeability data fall below a curve of the first quantile regression function, 50% of the one or more permeability data fall below a curve of the second quantile regression function, and 95% of the one or more permeability data fall below a curve of the third quantile regression function.

In another implementation, the method further includes obtaining one or more mean permeability data using the combined mean regression function; and deriving a final regression function from the one or more mean permeability data.

In one implementation, deriving a final regression function from the one or more mean permeability data comprises using a least squares method.

In one implementation, the transformation function comprises a logarithmic function.

In one implementation, the first quantile regression function, the second quantile regression function, and the third quantile regression function are each performed using a least squares method.

In one implementation, the combined mean regression function represents a continuous, conditional mean regression of the one or more permeability data.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

FIGS. 1.1-1.4 illustrate simplified, schematic views of an oilfield having subterranean formations containing reservoirs therein in accordance with implementations of various technologies and techniques described herein.

DETAILED DESCRIPTION

Figure 2:
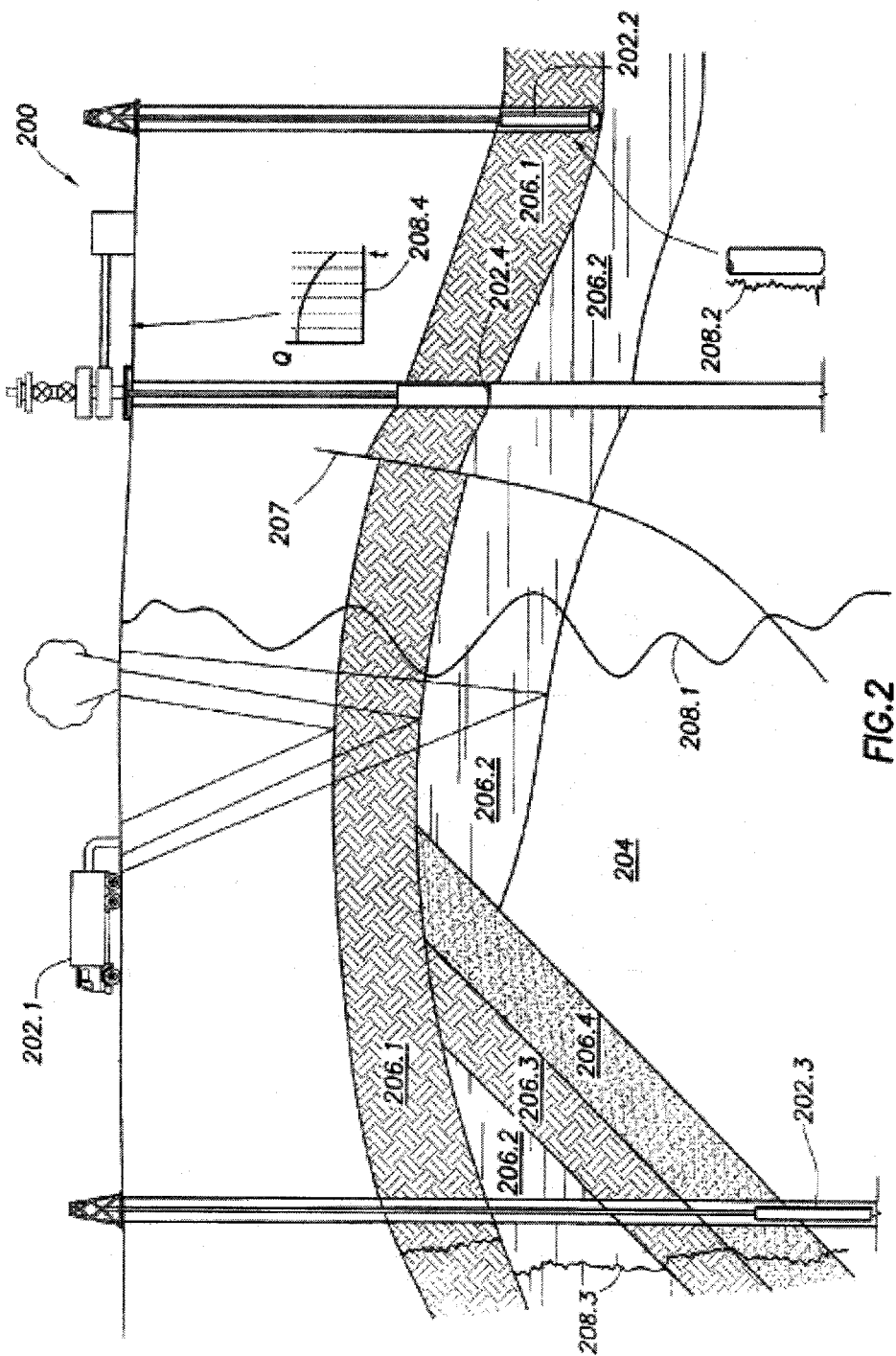
FIG. 2 illustrates a schematic view, partially in cross section of an oilfield having a plurality of data acquisition tools positioned at various locations along the oilfield for collecting data from the subterranean formations in accordance with implementations of various technologies and techniques described herein.

The discussion below is directed to certain specific implementations. It is to be understood that the discussion below is only for the purpose of enabling a person with ordinary skill in the art to make and use any subject matter defined now or later by the patent "claims" found in any issued patent herein.

Reference will now be made in detail to various implementations, examples of which are illustrated in the accompanying drawings and figures. In the following detailed description, numerous specific details are set forth in order to provide a thorough understanding of the claimed invention. However, it will be apparent to one of ordinary skill in the art that the claimed invention may be practiced without these specific details. In other instances, well known methods, procedures, components, circuits, and networks have not been described in detail so as not to unnecessarily obscure aspects of the claimed invention.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description herein is for the purpose of describing particular embodiments only and is not intended to limit the claimed invention. As used herein, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Various techniques described herein are implemented with reference to an oil field operation. As such, before describing implementations of these techniques, it may be useful to describe a suitable oil field operation that may benefit from the various techniques described herein.

Introduction to Oilfield Environment

FIGS. 1.1-1.4 illustrate simplified, schematic views of oilfield 100 having subterranean formation 102 containing reservoir 104 therein in accordance with implementations of various technologies and techniques described herein. FIG. 1.1 illustrates a survey operation being performed by a survey tool, such as seismic truck 106.1, to measure properties of the subterranean formation. The survey operation is a seismic survey operation for producing sound vibrations. In FIG. 1.1, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 1.2 illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is usually filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electro-magnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

FIG. 1.3 illustrates a wireline operation being performed by wireline tool 106.3 suspended by rig 128 and into wellbore 136 of FIG. 1.2. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 1.1. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example, porosity, permeability, fluid composition and/or other parameters of the field operation.

FIG. 1.4 illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1.2-1.4 illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1.1-1.4 are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 1.1-1.4, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively; however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that typically provides a resistivity or other measurement of the formation at various depths.

A production decline curve or graph 208.4 is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208.1 from data acquisition tool 202.1 is used by a geophysicist to determine characteristics of the subterranean formations and features. The core data shown in static plot 208.2 and/or log data from well log 208.3 are typically used by a geologist to determine various characteristics of the subterranean formation. The production data from graph 208.4 is typically used by the reservoir engineer to determine fluid flow reservoir characteristics. The data analyzed by the geologist, geophysicist and the reservoir engineer may be analyzed using modeling techniques.

Figure 3:
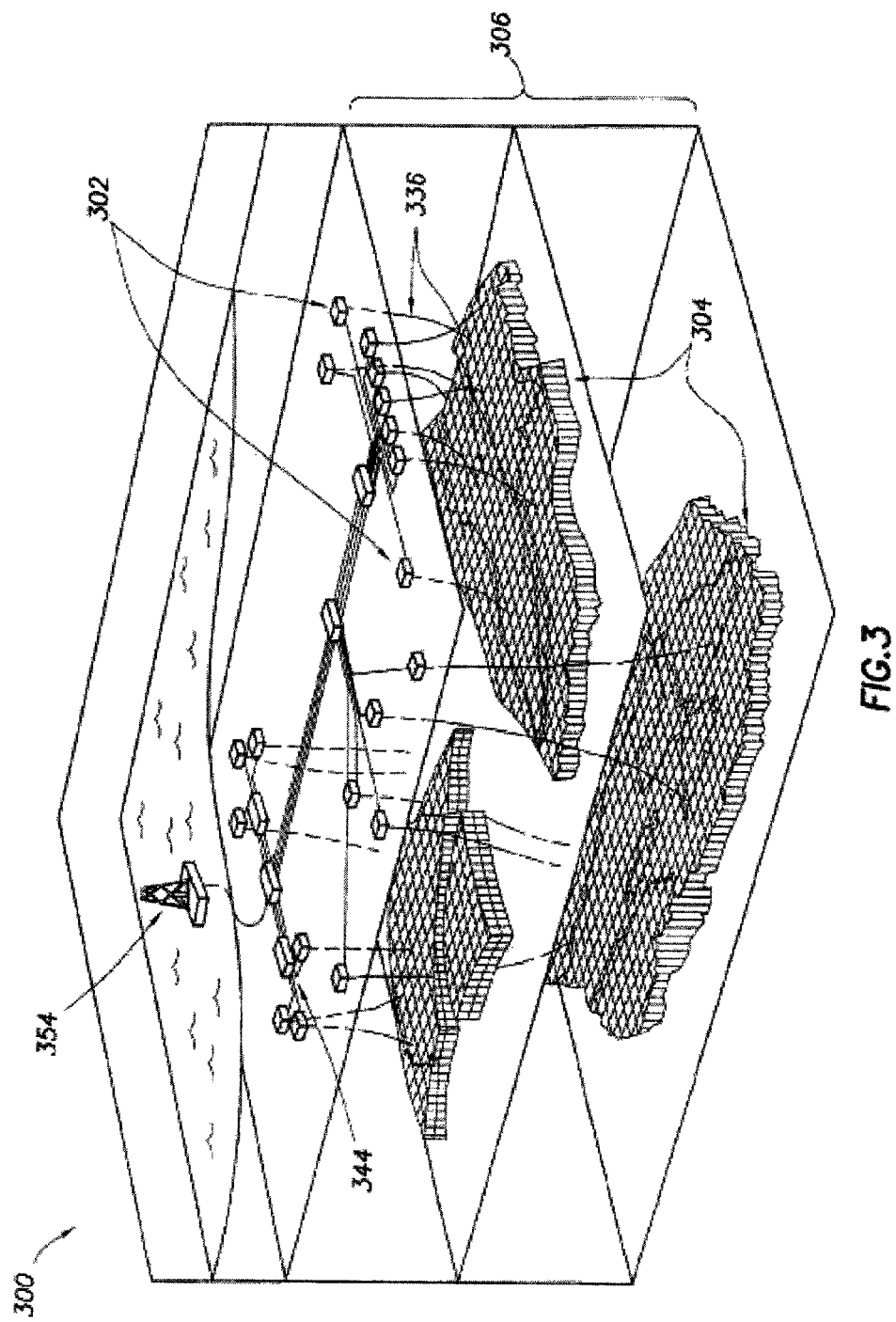
FIG. 3 illustrates a production system for performing one or more oilfield operations in accordance with implementations of various technologies and techniques described herein.

FIG. 3 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3 is not intended to limit the scope of the oilfield application system. Part or all of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Computing a Conditional Mean Permeability Regression

In one implementation, porosity data may be obtained by direct or indirect measurements. Direct methods may include laboratory measurements of porosity data on core samples. Methods for such measurements include gravimetric methods, volumetric methods, and methods using a porosimeter. Indirect methods may include determinations of porosity data from well log data. The well logs used may include density, sonic, neutron, and nuclear magnetic response (NMR) logs.

In one implementation, permeability data may be estimated from the obtained porosity data using mathematical correlations. One mathematical correlation using a logarithmic transformation function may be defined as:

$$k = \log_{10}(C_1 + C_2 \cdot \phi) \quad \text{Equation 1}$$

where k is the permeability, $\phi$ is the porosity, and C1 and C2 are constants that are determined by regression analysis on permeability and porosity data pairs. Non-logarithmic transformation functions may be used in other implementations of the mathematical correlations.

Using the estimated permeability data derived from Equation 1, a regression method may be used to produce a conditional mean permeability regression for use in predicting a mean permeability with respect to porosity. Any number of regression methods may be used, including a linear regression technique and a least squares regression technique.

However, using a regression method on data derived from a transformation function, such as the logarithmic transformation function of Equation 1, may lead to biasing. For example, the conditional mean permeability regression may underestimate permeability when compared to actual, measured permeability data. Prior to forming the conditional mean permeability regression, the estimated permeability data may be plotted on a logarithmic scale, due to the logarithmic transformation in Equation 1. The regression method, such as the least squares regression technique, may then produce a fit of the estimated permeability data, where the fit would need to be transformed back to an arithmetic scale via an exponential. As a result of this transformation, inaccuracies may result. This transformed fit leads to the conditional mean permeability regression, and may predict a mean permeability that is lower based on porosity than a mean based on measured permeability data.

In another implementation, as described in *Three Statistical Pitfalls of Phi-K Transforms, SPE Res Eval & Eng,* 10 (6): 609-617, SPE-102093-PA (2007) by Delfiner, P., the mean permeability may be predicted using quantiles. In this implementation, based on the estimated permeability data derived from Equation 1, data points at specified quantiles are computed for a set of estimated permeability data existing within specified slices of porosity. For example, for the estimated permeability data existing within a slice of 0 porosity-units (pu) to 5 pu, a data point may be computed at a 10% quantile ($X_{10}$), a 50% quantile ($X_{50}$), and a 90% quantile ($X_{90}$), where the data point computed at $X_{10}$ is greater than 10% of the estimated permeability data within the slice, the data point computed at $X_{50}$ is greater than 50% of the estimated permeability data within the slice, and the data point computed at $X_{90}$ is greater than 90% of the estimated permeability data within the slice. In a further implementation, a mean permeability data point for each slice may be found using the formula:

$$\text{mean data point for slice} = 0.3 \cdot X_{10} + 0.4 \cdot X_{50} + 0.3 \cdot X_{90} \quad \text{Equation 2}$$

A regression method may then be used over these mean permeability data points to produce a conditional mean permeability regression for use in predicting mean permeability.

Figure 4:
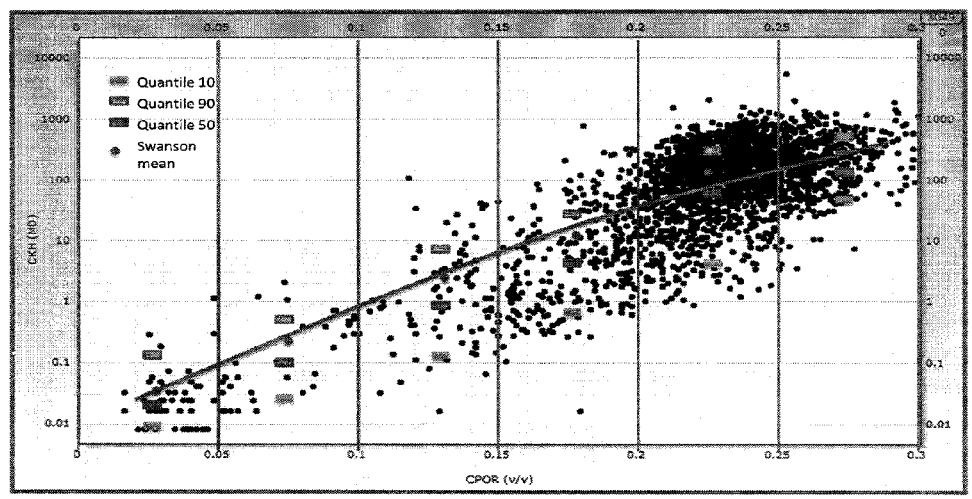
FIG. 4 illustrates a plot of permeability relative to porosity, wherein mean permeability data points are implemented on estimated permeability data points in accordance with implementations of various technologies and techniques described herein.

FIG. 4 illustrates a plot of permeability relative to porosity, wherein mean permeability data points are implemented on estimated permeability data points in accordance with implementations of various technologies and techniques described herein. As shown, data points at x10, x50, and x90 are computed for every 0.05 slice of the X-axis, based on the estimated data points within each slice. As shown, a mean permeability data point derived using Swanson's rule, labeled as Swanson's mean in FIG. 4, is calculated for every 0.05 slice of the X-axis. In addition, the least squares regression technique is implemented on the mean permeability data points, producing a conditional mean permeability regression.

In another implementation, the mean permeability data point for each slice may instead be computed using the formula:

$$\text{mean data point for slice} = 0.185 \cdot X_5 + 0.63 \cdot X_{50} + 0.185 \cdot X_{95}, \qquad \text{Equation 3}$$

where $X_5$ is greater than 5% of the estimated permeability data within the slice and $X_{95}$ is greater than 95% of the estimated permeability data within the slice.

Producing a Combined Mean Regression Function

Figure 5:
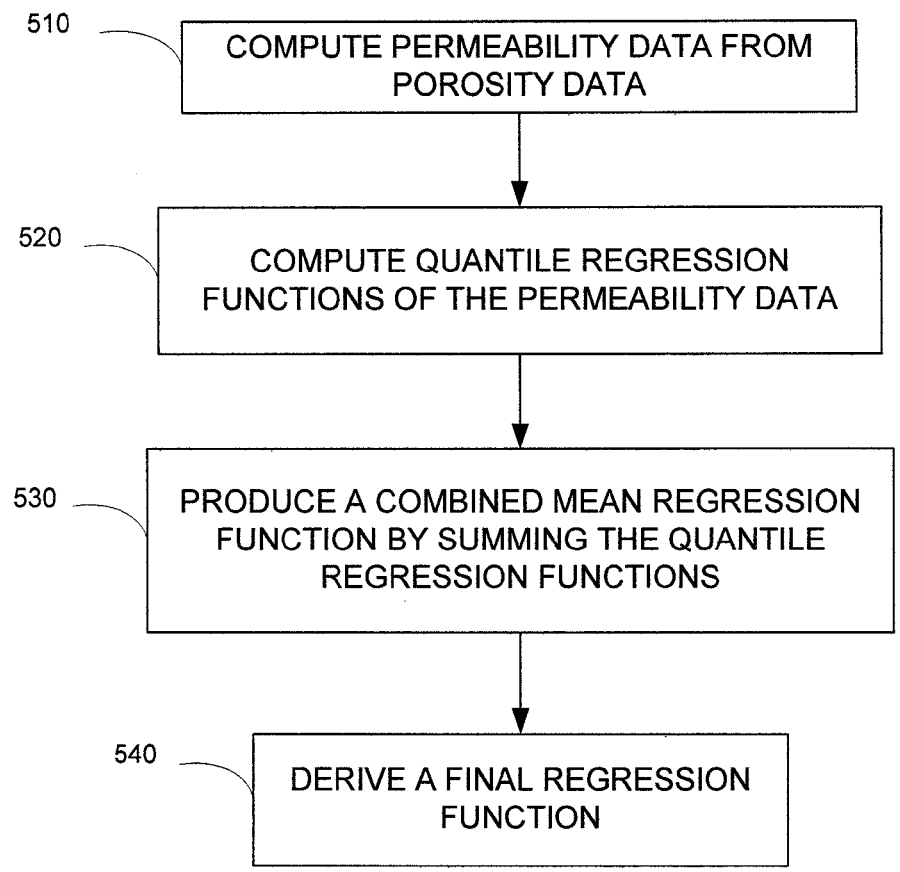
FIG. 5 illustrates a flow diagram of a method 500 for producing a mean permeability regression in accordance with implementations of various technologies and techniques described herein.
Figure 6:
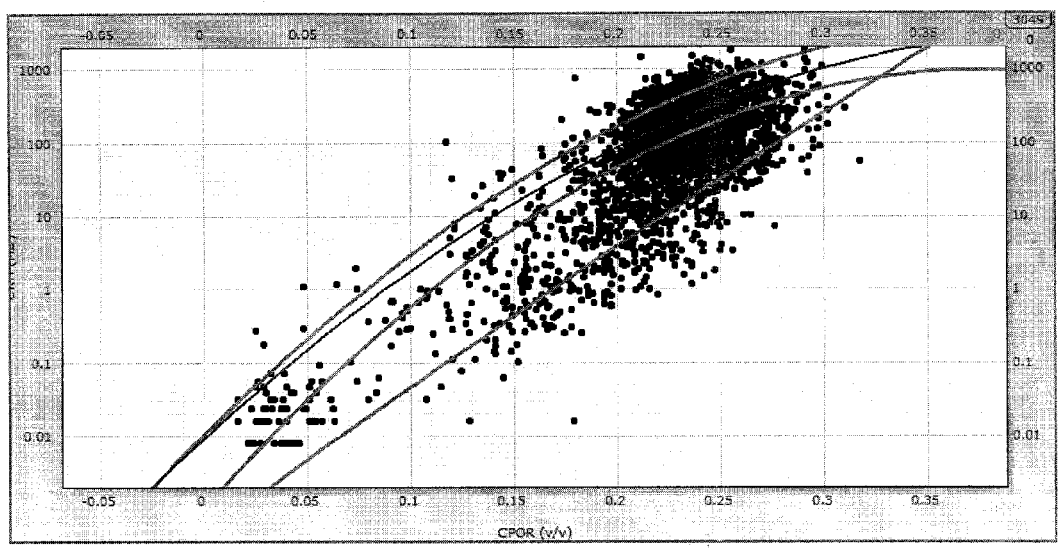
FIG. 6 illustrates a graphical illustration of estimated permeability data versus porosity data in accordance with implementations of various technologies and techniques described herein.

FIG. 5 illustrates a flow diagram of a method 500 for producing a mean permeability regression in accordance with implementations of various technologies and techniques described herein. In one implementation, method 500 may be performed by a computer application. It should be understood that while method 500 indicates a particular order of execution of the operations, in some implementations, certain portions of the operations might be executed in a different order. The following description of method 500 is provided with reference to the graphical illustration 600 of estimated permeability data versus porosity data in FIG. 6, illustrated in accordance with implementations of various technologies and techniques described herein.

At step 510, the computer application may compute permeability data from porosity data using a transformation function. In one implementation, the porosity data is obtained using a data acquisition tool as described with respect to FIGS. 1.1-1.4, 2, and 3. In another implementation, the permeability data is the estimated permeability data derived using Equation 1, where the transformation function is logarithmic.

At step 520, the computer application may compute quantile regression functions of the permeability data. In one implementation as shown in FIG. 6, quantile regression functions $Q_{10}$, $Q_{50}$, and $Q_{90}$ are computed and plotted for all estimated permeability data, such that 10% of the estimated permeability data will be under the $Q_{10}$ curve, 50% of the estimated permeability data will be under the $Q_{50}$ curve, and 90% of the estimated permeability data will be under the $Q_{90}$ curve. In an implementation, the quantile regression functions may be developed using any number of regression techniques, including a linear regression technique, a least squares regression technique, a multi-linear regression technique, and a nonlinear regression technique.

At step 530, the computer application may produce a combined mean regression function by summing the quantile regression functions. In one implementation, the combined mean regression function may be modeled after Equation 2, where:

$$\text{combined mean regression} = 0.3 \cdot Q_{10} + 0.4 \cdot Q_{50} + 0.3 \cdot Q_{90}. \qquad \text{Equation 4}$$

FIG. 6 illustrates a combined mean regression function modeled after Swanson's rule. In another implementation, the combined mean regression function may be modeled after Equation 3, where:

$$\text{combined mean regression} = 0.185 \cdot Q_5 + 0.63 \cdot Q_{50} + 0.185 \cdot Q_{95}, \qquad \text{Equation 5}$$

such that 5% of the estimated permeability data will be under the $Q_5$ curve and 95% of the estimated permeability data will be under the $Q_{95}$ curve. In one implementation, the combined mean regression function may be used to produce mean permeability data.

At step 540, the computer application may derive a final regression function. In one implementation, the final regression function is derived using the mean permeability data produced from the combined mean regression function. The final regression function may be developed using any number of regression techniques, including a linear regression technique, a least squares regression technique, a multi-linear regression technique, and a nonlinear regression technique.

In one implementation, the combined mean regression function represents a continuous, conditional mean regression of estimated permeability data. In another implementation, the combined mean regression may produce the results of a multi-linear regression to fit estimated permeability data derived from a bulk density, a deep resistivity, neutron porosity, and a core porosity curve.

Computer System

Figure 7:
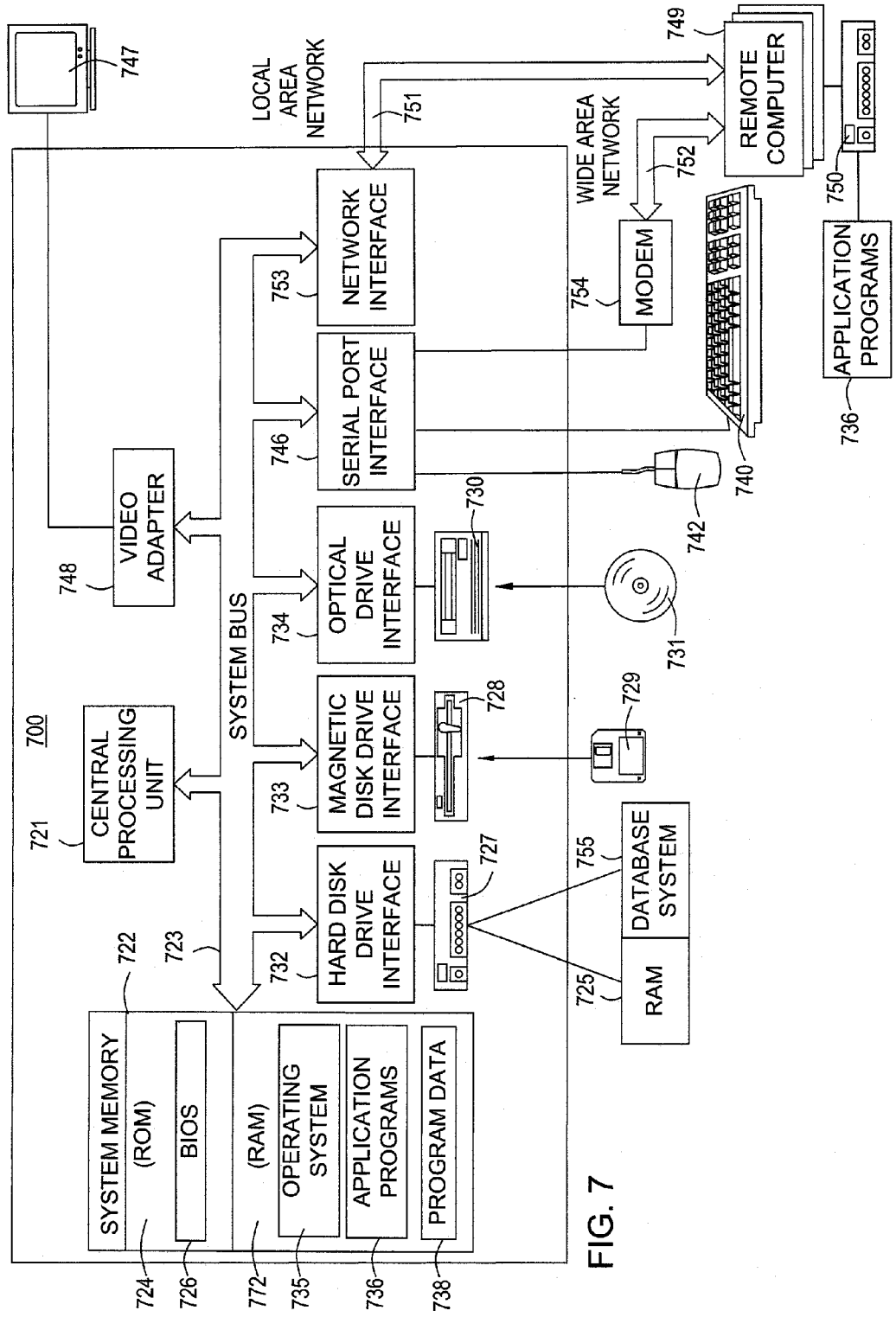
FIG. 7 illustrates a computer system into which implementations of various technologies and techniques described herein may be implemented.

FIG. 7 illustrates a computer system 700 into which implementations of various technologies and techniques described herein may be implemented. In one implementation, computing system 700 may be a conventional desktop or a server computer, but it should be noted that other computer system configurations may be used.

The computing system 700 may include a central processing unit (CPU) 721, a system memory 722 and a system bus 723 that couples various system components including the system memory 722 to the CPU 721. Although only one CPU is illustrated in FIG. 7, it should be understood that in some implementations the computing system 700 may include more than one CPU. The system bus 723 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 722 may include a read only memory (ROM) 724 and a random access memory (RAM) 725. A basic input/output system (BIOS) 726, containing the basic routines that help transfer information between elements within the computing system 700, such as during start-up, may be stored in the ROM 724.

The computing system 700 may further include a hard disk drive 727 for reading from and writing to a hard disk, a magnetic disk drive 728 for reading from and writing to a removable magnetic disk 729, and an optical disk drive 730 for reading from and writing to a removable optical disk 731, such as a CD ROM or other optical media. The hard disk drive 727, the magnetic disk drive 728, and the optical disk drive 730 may be connected to the system bus 723 by a hard disk drive interface 732, a magnetic disk drive interface 733, and an optical drive interface 734, respectively. The drives and their associated computer-readable media may provide nonvolatile storage of computer-readable instructions, data structures, program modules and other data for the computing system 700.

Although the computing system 700 is described herein as having a hard disk, a removable magnetic disk 729 and a removable optical disk 731, it should be appreciated by those skilled in the art that the computing system 700 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 700. Communication media may embody computer readable instructions, data structures, program modules or other data in a modulated data signal, such as a carrier wave or other transport mechanism and may include any information delivery media. By way of example, and not limitation, communication media may include wired media such as a wired network or direct-wired connection, and wireless media such as acoustic, RF, infrared and other wireless media. Combinations of any of the above may also be included within the scope of computer readable media.

A number of program modules may be stored on the hard disk 727, magnetic disk 729, optical disk 731, ROM 724 or RAM 725, including an operating system 735, one or more application programs 736, program data 738, and a database system 755. The operating system 735 may be any suitable operating system that may control the operation of a networked personal or server computer, such as Windows® XP, Mac OS® X, Unix-variants (e.g., Linux® and BSD®), and the like. In one implementation, the computer application described with reference to FIG. 5 in the paragraphs above may be stored as application programs 736.

A user may enter commands and information into the computing system 700 through input devices such as a keyboard 740 and pointing device 742. Other input devices may include a microphone, joystick, game pad, satellite dish, scanner, or the like. These and other input devices may be connected to the CPU 721 through a serial port interface 746 coupled to system bus 723, but may be connected by other interfaces, such as a parallel port, game port or a universal serial bus (USB). A monitor 747 or other type of display device may also be connected to system bus 723 via an interface, such as a video adapter 748. In addition to the monitor 747, the computing system 700 may further include other peripheral output devices such as speakers and printers.

Further, the computing system 700 may operate in a networked environment using logical connections to one or more remote computers 749. The logical connections may be any connection that is commonplace in offices, enterprise-wide computer networks, intranets, and the Internet, such as local area network (LAN) 751 and a wide area network (WAN) 752. The remote computers 749 may each include application programs 736 similar to that as described above.

When using a LAN networking environment, the computing system 700 may be connected to the local network 751 through a network interface or adapter 753. When used in a WAN networking environment, the computing system 700 may include a modem 754, wireless router or other means for establishing communication over a wide area network 752, such as the Internet. The modem 754, which may be internal or external, may be connected to the system bus 723 via the serial port interface 746. In a networked environment, program modules depicted relative to the computing system 700, or portions thereof, may be stored in a remote memory storage device 750. It will be appreciated that the network connections shown are exemplary and other means of establishing a communications link between the computers may be used.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A method, comprising:
obtaining one or more porosity data of a subsurface of the Earth using a data acquisition tool;
computing one or more permeability data from the porosity data using a transformation function;
computing a first quantile regression function and a second quantile regression function of the one or more permeability data;
producing a combined mean regression function of the one or more permeability data by summing the first quantile regression function and the second quantile regression function, wherein the first quantile regres- sion function is multiplied by a first coefficient and the second quantile regression function is multiplied by a second coefficient; and using the combined mean regression function to predict a mean permeability of the subsurface.

2. The method of claim 1, further comprising computing a third quantile regression function of the one or more permeability data.

3. The method of claim 2, wherein producing the combined mean regression function further comprises:

summing the first quantile regression function, the second quantile regression function, and the third quantile regression function, wherein the third quantile regression function is multiplied by a third coefficient.

4. The method of claim 3, wherein in a graphical plot of the permeability data relative to the porosity data, 10% of the one or more permeability data fall below a curve of the first quantile regression function, 50% of the one or more permeability data fall below a curve of the second quantile regression function, and 90% of the one or more permeability data fall below a curve of the third quantile regression function.

5. The method of claim 4, wherein the first coefficient is 0.3, the second coefficient is 0.4, and the third coefficient is 0.3.

6. The method of claim 3, wherein in a graphical plot of the permeability data relative to the porosity data, 5% of the one or more permeability data fall below a curve of the first quantile regression function, 50% of the one or more permeability data fall below a curve of the second quantile regression function, and 95% of the one or more permeability data fall below a curve of the third quantile regression function.

7. The method of claim 6, wherein the first coefficient is 0.185, the second coefficient is 0.63, and the third coefficient is 0.185.

8. The method of claim 1, further comprising:

obtaining one or more mean permeability data using the combined mean regression function; and deriving a final regression function from the one or more mean permeability data.

9. The method of claim 8, wherein deriving a final regression function from the one or more mean permeability data comprises using a least squares method.

10. The method of claim 1, wherein the transformation function comprises a logarithmic function.

11. The method of claim 3, wherein the first quantile regression function, the second quantile regression function, and the third quantile regression function are each performed using a least squares method.

12. The method of claim 1, wherein the combined mean regression function represents a continuous, conditional mean regression of the one or more permeability data.

13. A computer-readable medium having stored thereon computer-executable instructions which, when executed by a computer, cause the computer to:

obtain one or more porosity data of a subsurface of the Earth using a data acquisition tool;

compute one or more permeability data from the porosity data using a transformation function;

compute a first quantile regression function and a second quantile regression function of the one or more permeability data;

produce a combined mean regression function of the one or more permeability data by summing the first quantile regression function and the second quantile regression function, wherein the first quantile regression function is multiplied by a first coefficient and the second quantile regression function is multiplied by a second coefficient; and use the combined mean regression function to predict a mean permeability of the subsurface.

14. The computer-readable medium of claim 13, further comprising computer-executable instructions which, when executed by a computer, cause the computer to computing a third quantile regression function of the one or more permeability data.

15. The computer-readable medium of claim 14, wherein the instructions which, when executed by a computer, cause the computer to produce the combined mean regression function further comprises instructions configured to sum the first quantile regression function, the second quantile regression function, and the third quantile regression function, wherein the third quantile regression function is multiplied by a third coefficient.

16. The computer-readable medium of claim 15, wherein in a graphical plot of the permeability data relative to the porosity data, 10% of the one or more permeability data fall below a curve of the first quantile regression function, 50% of the one or more permeability data fall below a curve of the second quantile regression function, and 90% of the one or more permeability data fall below a curve of the third quantile regression function.

17. A computer system, comprising:

a processor; and a memory comprising program instructions executable by the processor to:

obtain one or more porosity data of a subsurface of the Earth using a data acquisition tool;

compute one or more permeability data from the porosity data using a transformation function;

compute a first quantile regression function and a second quantile regression function of the one or more permeability data;

produce a combined mean regression function of the one or more permeability data by summing the first quantile regression function and the second quantile regression function, wherein the first quantile regression function is multiplied by a first coefficient and the second quantile regression function is multiplied by a second coefficient; and use the combined mean regression function to predict a mean permeability of the subsurface.

18. The computer system of claim 17, wherein the memory further comprises program instructions executable by the processor to:

obtain one or more mean permeability data using the combined mean regression function; and derive a final regression function from the one or more mean permeability data.

19. The computer system of claim 17, wherein the transformation function comprises a logarithmic function.

20. The computer system of claim 17, wherein the combined mean regression function represents a continuous, conditional mean regression of the permeability data.

* * * * *